United States Patent

[11] 3,628,818

[72] Inventor Maurice B. Pittman
1786 Oakwood Drive, Memphis, Tenn. 38116
[21] Appl. No. 836,805
[22] Filed June 26, 1969
[45] Patented Dec. 21, 1971

[54] EGG-HANDLING DEVICE
1 Claim, 2 Drawing Figs.

[52] U.S. Cl. ..................................... 294/16, 294/28
[51] Int. Cl. ................................... A47j 29/06
[50] Field of Search .......................... 294/11, 13, 28, 29, 30, 118, 16, 50.7; 128/321, 322

[56] References Cited
UNITED STATES PATENTS
| | | | |
|---|---|---|---|
| 400,067 | 3/1889 | Evans | 294/28 X |
| 2,959,442 | 11/1960 | Kaegebein | 294/31 |
| 3,361,468 | 1/1968 | Case | 294/28 X |

FOREIGN PATENTS
| | | | |
|---|---|---|---|
| 448,946 | 6/1948 | Canada | 294/28 |

*Primary Examiner*—Evon C. Blunk
*Assistant Examiner*—Johnny D. Cherry
*Attorney*—William S. Dorman ABSTRACT: An egg-handling device comprising a pair of levers or arm members pivotally secured in scissor-type relationship for facilitating opening and closing thereof. Each arm member is provided with a finger-receiving eye at one end thereof and complementary egg receiving and retaining half sections on the opposite end thereof. Each half section comprises an arcuate cage-type member of a configuration generally similar to the outer configuration of a portion of an egg whereby an egg may be easily retained within the combined half sections in the closed position of the arm member. The longitudinal axis of each half-section cage member is substantially perpendicular to the respective arm member for facilitating manipulation of the device in the retrieving and handling of an egg.

PATENTED DEC 21 1971

3,628,818

MAURICE B. PITTMAN
INVENTOR

BY
William S. Dorman
ATTORNEY

EGG-HANDLING DEVICE

This invention relates to improvements in food-handling implements and more particularly, but not by way of limitation, to an egg-handling device.

Eggs are frequently cooked in the shell and are usually removed from the hot cooking water by lifting the hot-cooked egg therefrom. The heat of both the water and egg render it difficult to retrieve the egg with the hand, and normally requires the use of a utensil or implements of some type. In addition, eggs are frequently dyed or colored and it is desirable or necessary to place the egg into a liquid and remove the egg therefrom by use of a suitable implement. Devices are presently available for this type of handling of eggs, but they have certain disadvantages in that the egg retrieving and holding element is usually an extension of the handle member whereby the longitudinal axis of the egg-holding element is substantially parallel with the handle member. This increases the difficulty of retrieving the egg and in retaining the egg in the holding element since it is necessary to hold the implement in a somewhat awkward position to preclude dropping of the egg therefrom.

The present invention contemplates a novel egg-handling device wherein the egg retrieving and retaining member is particularly designed and constructed for overcoming the above disadvantages. The longitudinal axis of the egg-holding element is substantially perpendicular with the handle portion thus permitting efficient retrieving and retaining of the egg in the more natural manual handling of the device. The novel egg-handling implement comprises a pair of arm members pivotally secured in a scissor-type arrangement for facilitating opening and closing of the arm member with respect to each other, as is well known. Each arm member is provided with an eye member at one end thereof and a cage-type half section at the opposite end thereof. Each cage section is of a configuration generally corresponding to the outer periphery of an egg and in the closed position of the device, the half sections are disposed in adjacent positions for forming an egg receiving and holding chamber. The longitudinal axis of each cage section is substantially perpendicular to the respective arm member, thus greatly facilitating manipulation of the device during the retrieving and holding of an egg therein.

It is an important object of this invention to provide a novel egg-handling implement particularly designed and constructed for facilitating retrieving and holding of an egg in a substantial normal manipulation of the device.

Another object of this invention is to provide a novel egg-handling implement wherein an egg may be quickly and easily removed from or placed in a liquid.

Still another object of this invention is to provide a novel egg-handling implement wherein an egg may be efficiently retained with a minimum danger of breakage of the egg during handling.

Other and further objects and advantageous features of the present invention will hereinafter more fully appear in connection with a detailed description of the drawings in which.

Figure 1:
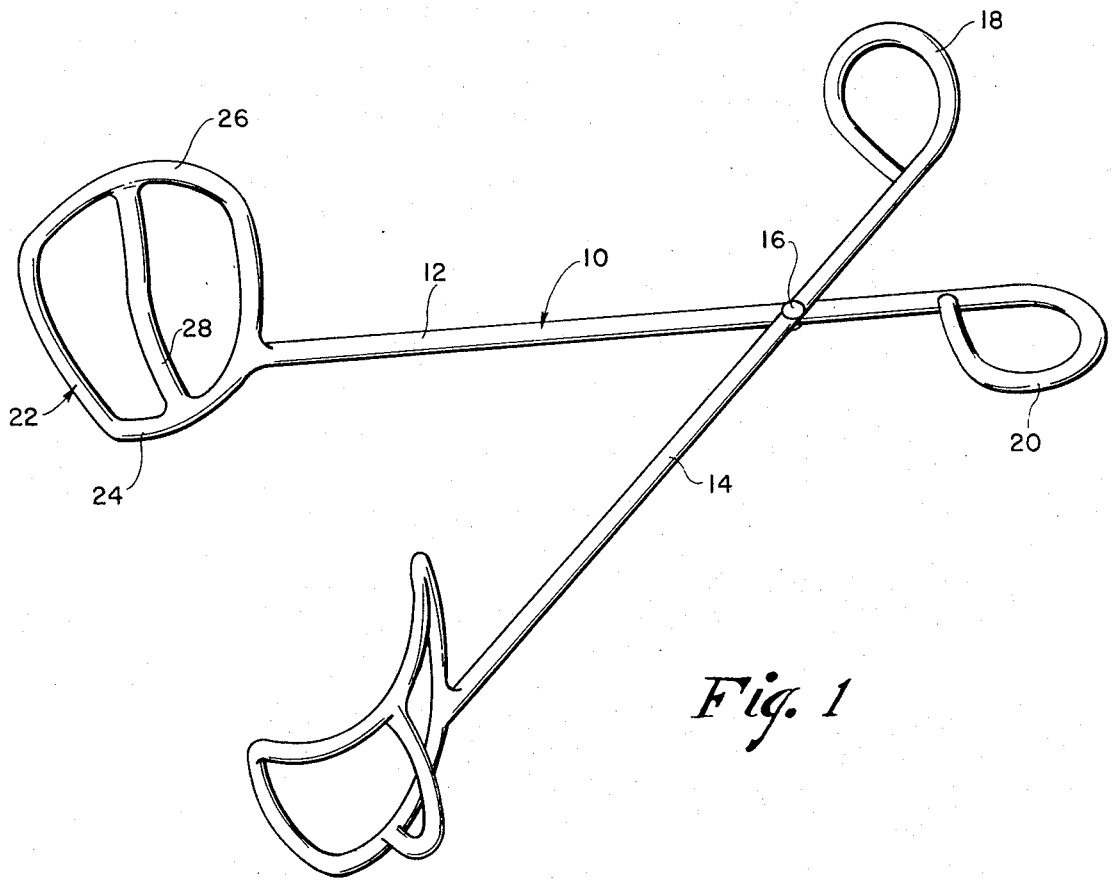
FIG. 1 is a perspective view of an egg-handling device embodying the invention and depicted in an open position.

Referring to the drawings in detail, reference character 10 generally indicates an egg-handling implement comprising a pair of substantially identical but oppositely disposed pincer members 12 and 14 pivotally secured together at 16 in any suitable manner, as is well known. The pincer members 12 and 14 are preferably substantially flat and are each provided with a finger-receiving eye member 18 and 20, respectively, at one end thereof. The pivot member 16 is preferably disposed in nearer proximity to the eye members 18 and 20 than the opposite ends of the pincers or arms 12 and 14 for facilitating the overall operation of the device 10. In addition, the plane of the eye members 18 and 20 is preferably substantially parallel with and in substantial alignment with the plane of the respective arm 12 and 14.

A cagelike half section member 22 is provided on the opposite end of the arm or pincer 12 and comprises a first arcuate rib member 24 extending across the lower portion and side portions thereof as viewed in the drawings. The plane of the arcuate member 24 is substantially perpendicular to the line or plane of the arm 12. A second arcuate rib member 26 extends across the upper edge or rim of the half cage 22 and is of a configuration and substantially corresponding to the outer periphery of half an egg in a transverse direction thereof. The plane of the arcuate member 26 is preferably substantially perpendicular to the plane of the first arcuate member 24. A third arcuate rib member 28 extends between the elements 24 and 26 and is preferably substantially centrally disposed with respect thereto. The configuration of the arcuate member 28 corresponds generally with the longitudinal configuration of an egg and bulges outwardly from the member 24 into connection with the outward bulge portion of the upper member 26. The longitudinal dimension of the half cage 22 is substantially perpendicular to the arm 12.

A cagelike half section 30 is provided on the opposite end of the arm or pincer 14 and is similar to the half cage 22, but oppositely disposed with respect thereto. The half cage 30 comprises a first arcuate member 32 similar to the member 24 and extending across the bottom or lower portion and side portions of the cage 22 as viewed in the drawings. The plane of the arcuate member 24 is substantially perpendicular to the line or plane of the arm 12. A second arcuate member 34 similar to the member 26 is provided around the upper edge or rim of the half cage 30 and is of a configuration substantially corresponding to the outer periphery of half an egg in the transverse direction thereof. The plane of the arcuate member 34 is preferably substantially perpendicular to the plane of the first arcuate member 32. A third arcuate member 36 similar to the member 28 extends between the upper rim 34 and the member 32 and is of a configuration substantially corresponding to the longitudinal configuration of an egg and bulges outwardly from the member 32 into connection with the outward bulge portion of the upper member 34. The longitudinal dimension of the half cage 30 is substantially perpendicular to the arm 14.

Figure 2:
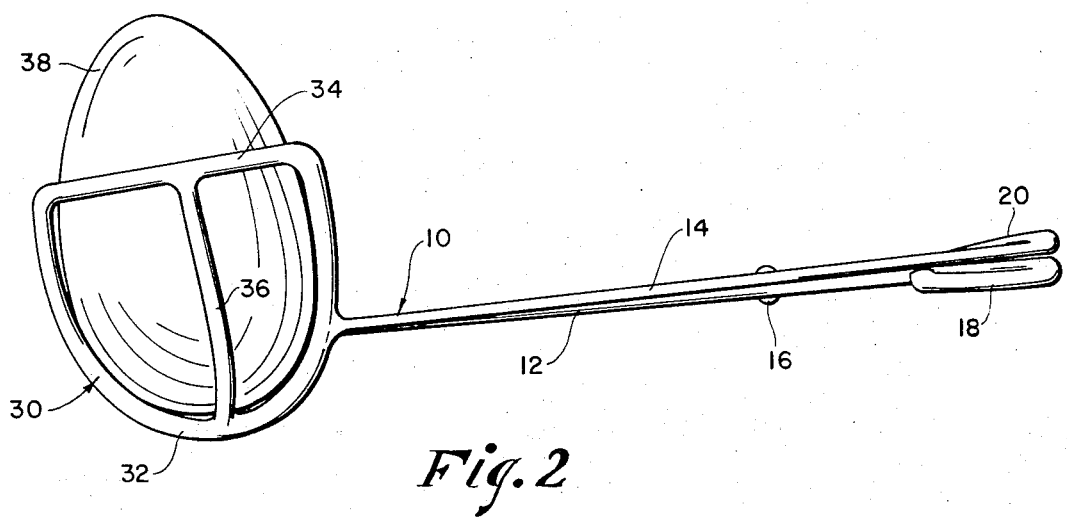
FIG. 2 is a side elevational view of an egg-handling device embodying the invention and depicted in a closed position with an egg disposed therein.

The arcuate member 32 of the half cage 30 is adapted for disposition adjacent or in the proximity of the arcuate member 24 of the half cage 22 in the closed position of the pincers 12 and 14 wherein the half cages 22 and 30 cooperate to provide a receptacle of a configuration generally similar or corresponding to substantially half an egg 38 in the longitudinal direction, and slightly longer than one-half the length of a usual egg, as particularly shown in FIG. 2. The longitudinal axis of the chamber thus formed is substantially perpendicular to the arms 12 and 14.

When it is desired to pick up the egg 38 with the tool 10, such as upon retrieving the egg 38 from a quantity of boiling or hot water, the pincers 12 and 14 may be manually grasped by placing a finger in each of the eye members 18 and 20, as is well known. The eye members 18 and 20 may be moved into positions adjacent each other whereby the half-cage sections 22 and 30 are placed in close proximity as shown in FIG. 2. The tool 10 may then be easily held in a position wherein the arms or pincers 12 and 14 are substantially horizontally disposed, thus greatly facilitating the manipulation of the device by the fingers engaged in the eye members 18 and 20. The closed half cages 22 and 30 may then be dipped into the hot water and placed below the egg 38, and easily raised for retrieving the egg in the combined cages. The longitudinal axis of the cage sections 22 and 30 is substantially vertical during the retrieving operation, thus gravity assists in holding the egg in the cages and precludes the necessity of using undue force or pressure against the sides of the egg 38.

The captured egg 38 within the cages 22 and 30 may then be easily removed from the water and carried to a place of storage, or the like. It is to be noted that the longitudinal dimension of the cages 22 and 30 is preferably slightly greater than one-half the length of the normal egg whereby the upper rim members 26 and 34 are disposed slightly above the largest portion of the egg 38 retained in the tool 10. Thus, the egg 38 will remain securely within the cages 22 and 30 even if the tool 10 were to be turned to an upside down position. This greatly facilitates holding of the egg 38, particularly when the egg is hot, as for example when preparing soft-boiled or soft-cooked eggs. In this instance, the egg 38 may be removed from the hot water as hereinbefore set forth and held firmly in the tool 10, with the upper portion of the egg protruding above the cage, as shown in FIG. 2. The egg may thus be held in the tool 10 by one hand while the other hand may be used for cracking the egg transversely for permitting scooping of the contents for the hot shell. This eliminates the need for running cold water, or the like, over the cooked egg prior to manual handling thereof, which is usually necessary in this type of operation.

When the egg 38 is to be stored for future use, or the like, the eye members 18 and 20 may be moved apart for opening of the cage section 22 and 30 whereby the egg 38 will be released for easy removal from the device 10. The particular arrangement of the longitudinal axis of the cage section in a substantially perpendicular relationship with respect to the arms 12 and 14 permits the handling of the tool 10 in a natural and easy manner to maintain the egg securely within the cage without having to assume an awkward position for the hand using the tool.

Of course, the placing of the egg 38 in a quantity of liquid, such as upon the dying of an egg, or the like, may be easily accomplished. The pincers 12 and 14 may be moved to the closed position therefor as hereinbefore set forth, and the egg 38 may be either manually placed within the closed cage or may be scooped into the closed cage. The egg 38 may be easily lowered into the liquid and the longitudinal axis of the closed cage may be easily maintained substantially vertical to facilitate retaining of the egg therein. The egg 38 may be retained in the closed cage for sufficient length of time for completing the dying operation, if desired, and then may be lifted from the liquid in the manner as hereinbefore set forth.

From the foregoing it will be apparent that the present invention provides a novel egg-handling implement particularly designed and constructed for facilitating the manipulation of the tool and more efficiently retrieving and retaining the egg. The perpendicular relationship between the egg-receiving chamber or cage and the pincer members assures an efficient retrieving of the egg with a minimum of pressure or force against the outer periphery of the egg. In addition, the substantially upright position of the egg-receiving cage or receptacle permits the egg to be more efficiently retained in the tool by gravity for reducing hazards of breakage of the egg due to dropping thereof. The novel egg-handling tool is simple and efficient in operation and economical and durable in construction.

Whereas the present invention has been described in particular relation to the drawings attached thereto, it should be understood that other and further modifications, apart from those shown or suggested herein, may be made within the spirit and scope of this invention.

What is claimed is:

1. An egg-handling implement comprising a pair of pincer members pivotally secured together to provide alternate open and closed positions for the implement, eye members provided at one end of each pincer member, substantially identical oppositely disposed half cage means provided on the opposite end of each pincer member, said half cage means cooperating for forming an egg-receiving receptacle in the closed position of the implement, each of said half cage means comprising a first arcuate rib member of substantially U-shaped configuration disposed substantially perpendicular to the plane of the pincers and engageable with each other in the closed position of the implement to provide a substantially closed end for the egg-receiving receptacle to support the egg therein, each of said U-shaped ribs having a second arcuate rib member extending across the open end thereof and being disposed in a plane substantially perpendicular to the plane of the U-shaped ribs and cooperating to provide an open end for the egg-receiving receptacle surrounding the outer periphery of the egg in the closed position of the implement, each of said half cage means being provided with an outwardly bulging third arcuate rib member secured between the first and second arcuate rib members and of a configuration substantially conforming to the longitudinal configuration of the outer periphery of the egg, said egg-receiving receptacle having the longitudinal axis thereof substantially perpendicular to the plane of the pincer members and the open end thereof substantially parallel with the plane of the pincers whereby the egg supported therein may be maintained in a substantially vertical position, each of said U-shaped rib members being of an overall longitudinal length slightly greater than one-half the length of the egg whereby each of the second arcuate ribs is disposed slightly beyond the largest transverse portion of the egg in the closed position of the implement for precluding accidental dropping of the egg engaged thereby and facilitating holding of the egg during transverse breaking of the egg.

* * * * *